United States Patent
Dee

[15] 3,705,751
[45] Dec. 12, 1972

[54] SPHERICAL BEARING
[72] Inventor: Colin W. Dee, Wimborne, England
[73] Assignee: The Horstmann Gear Co. Ltd., Bath, Somerset, England
[22] Filed: March 23, 1970
[21] Appl. No.: 21,916

[30] Foreign Application Priority Data
April 22, 1969  Great Britain..........20,503/69

[52] U.S. Cl..........................................308/9, 308/72
[51] Int. Cl..............................................F16c 17/16
[58] Field of Search..........................................308/9

[56] References Cited
UNITED STATES PATENTS

| | | | |
|---|---|---|---|
| 3,368,850 | 2/1968 | Wilcox | 308/9 |
| 2,095,313 | 10/1937 | Carter et al | 308/9 |
| 3,068,551 | 12/1962 | Cobb | 308/72 |
| 3,256,451 | 6/1966 | Shipman | 308/9 |
| 3,302,048 | 1/1967 | Gray | 308/9 |
| 3,506,315 | 4/1970 | Young, Jr. | 308/72 |

Primary Examiner—Martin P. Schwadron
Assistant Examiner—Frank Susko
Attorney—William Anthony Drucker

[57] ABSTRACT

A fluid bearing has a radially-inner bearing member and a radially outer bearing member respectively having a part-spherical internal surface and a part-spherical external surface defining between them a fluid bearing gap, one of the bearing members having in it one or more rows of fluid feed slots disposed circumferentially and each opening at one end in the part-spherical surface of that bearing member, said bearing member including passage means communicating with the other end of each of the slots for supply of fluid through the slots to the bearing gap.

6 Claims, 9 Drawing Figures

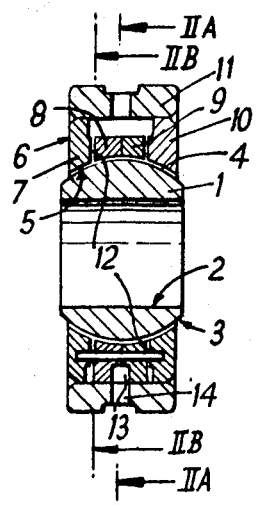
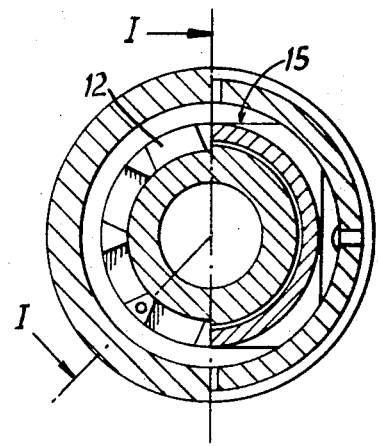
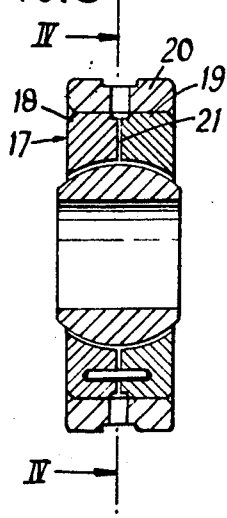
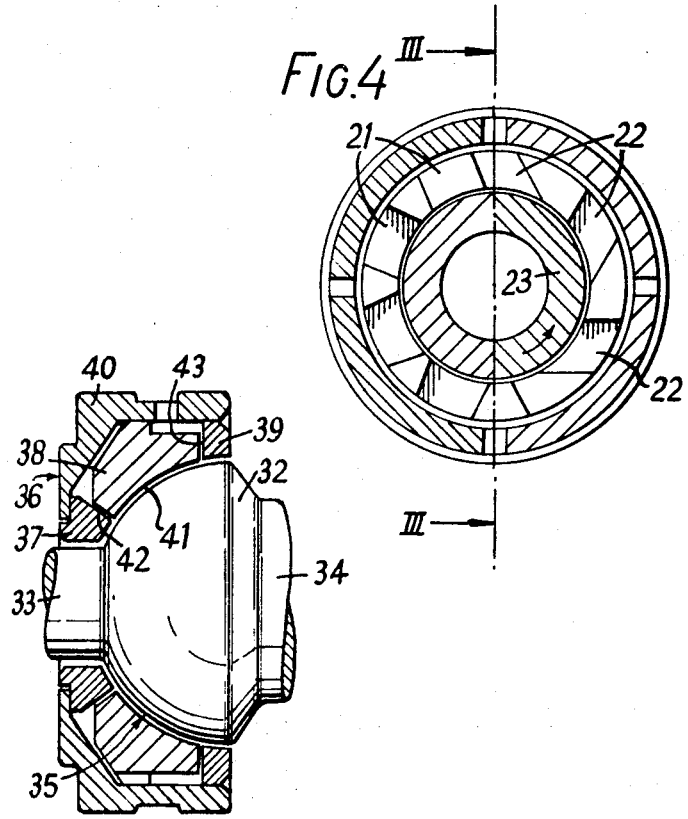
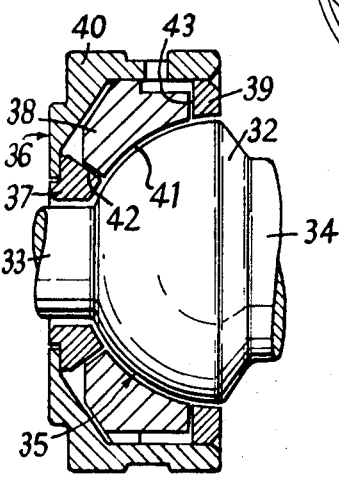

INVENTOR:

COLIN W. DEE

SPHERICAL BEARING

This invention relates to bearings in which fluid is fed under pressure to a bearing gap defined between two relatively rotatable bearing members.

Where both axial and radial thrusts must be carried by a bearing, it is not sufficient to use only a simple journal bearing having a cylindrical bearing gap, since some form of axial thrust bearing must also be included.

One well known solution is to combine, in a bearing assembly, both a journal bearing and one or more thrust bearings. The or each thrust bearing may be fed with fluid either by providing it with its own fluid feed openings, or by arranging for bleed of fluid from the adjacent end of the journal bearing gap. In the first instance, the construction of the bearing is made more complex, and in the second instance the load-bearing characteristics of the thrust bearing, fed by exhaust from a journal bearing which may itself be subjected to varying loads and conditions, cannot accurately be predicted and may be seriously deficient under some operating conditions.

It is accordingly a first object of the present invention to provide an improved fluid bearing which is capable of supporting both axial and radial thrusts, and in which only a single bearing gap fulfills both of those functions, thereby permitting a relatively simple construction of predictable operation according to known design parameters.

Another requirement which can occur in rotating devices is that of permitting a degree of tilt of the axis of one of a pair of rotating elements with respect to the axis of the other of the pair. For example, where a rotating element is supported by two bearings which are spaced along the axis of the rotating element, it will normally be essential to ensure very accurate alignment of both the stator and the rotor of each bearing with respect to the axis of rotation of the rotating element. This is particularly the case with fluid bearings in which the radial width of the conventional cylindrical bearing gap is inherently very small.

It is accordingly a second object of the present invention to provide an improved fluid bearing which can undergo a relatively substantial degree of tilt of the axis of one element of the bearing with respect to the axis of the other element of the bearing, without detriment to the load-supporting functions of the bearing.

According to the present invention a fluid bearing comprises a radially inner bearing member and a radially outer bearing member, the outer member having a part-spherical internal surface and the inner member having a part-spherical external surface, said internal surface and said external surface defining between them a fluid bearing gap, one of said bearing members having in it one or more rows of fluid feed slots disposed circumferentially and each opening at one end in the part-spherical surface of that bearing member, said bearing member including passage means communicating with the other end of each of the slots for supply of fluid through the slots to the bearing gap.

Preferred design factors of the fluid feed slots are set forth in my U.S. Pat. applications Nos. 557,231, 710,258, 684,317, 737,005, and 814,135; and in my granted U.S. Pat. Nos. 3,410,616 and 3,437,387, and in United Kingdom Patent Application No. 55455/68, in which I am the inventor. The slots may advantageously: (i) be disposed at equally angularly spaced intervals about the circumference, and/or (ii) be of equal angular length, and/or (iii) be separated by lands or spacers of equal angular length, and/or (iv) be parallel-sided, and/or (v) have their median plane of symmetry normal to that boundary surface of the bearing gap at which they open at one of their ends, and/or (vi) be of an axial depth which is comparable to the radial width of the bearing gap, i.e. not greater than, and not less than about 70 percent and preferably between 80 and 100 percent, of the radial width of the bearing gap, where $\alpha$ is about 2, and/or (vii) be such that the dimensionless parameter $\alpha$ falls within about 2 to about 8, $\alpha$ being for a single row of slots:

$$\alpha = 2\left(\frac{y}{l}\right) \cdot \left(\frac{h}{z}\right)^3$$

and for a double row of slots:

$$\alpha = \left(\frac{y}{l}\right) \cdot \left(\frac{h}{z}\right)^3$$

where
 $y =$ radial length of the slot
 $l =$ the distance from the point of fluid entry into the bearing to the end of the bearing
 $h =$ the radial width of the bearing gap
 $z =$ the axial depth of the slot.

In a preferred form of construction, the or each row of slots is defined between butted faces of two elements included in said bearing member. For example, the slots may be defined between a recessed face of one element and a plain face of the other element, or between recessed faces of both elements.

Where the slots are formed in the outer member, the elements between which the slots are defined may conveniently be retained in abutment by an annular wrapper.

Where it is desired that the entry of the fluid to the bearing gap shall not exert any torque on the bearing members, the median line of each slot is preferably made radial to the axis of symmetry of the bearing member. However, where it is desired to feed in the fluid in a direction counter to the relative movement of the other bearing member, e.g. to lessen or eliminate any tendency of the bearing film to rotate with the other bearing member, the slots may have their median line tangential to a circle coaxial with the axis of symmetry of the bearing member.

Where the bearing is intended to carry both a radial load and an axial thrust in either direction, the respective part-spherical surface of each of the bearing members is defined between two lesser circumferences axially spaced one at each side of a coaxial intermediate greater circumference. The axis of rotation of the inner bearing member need not remain aligned with the axis of symmetry of the outer bearing member, but can be shifted angularly within limits.

It is well known to provide conventional ball and roller bearings as an assembled unit of relatively small length-to-diameter ratio. It is also well known to provide, in such units, a relatively deep groove in at least the outer race member, and to make the groove part-spherical in order to permit the inner race to pass slightly out of true axial alignment with respect to the outer race. An advantage of the present invention is that it permits the construction of fluid bearings of relatively small length-to-diameter ratios and which can have a considerable degree of misalignment of the axis of rotation, whereby they can be of comparable dimensions to ball and roller races and can provide for even greater misalignment than is possible with ball races.

Where the bearing is intended to carry both a radial load and an axial thrust in one direction only, e.g. as with a conventional angular contact ball bearing, the respective part-spherical surface of each of the bearing members is defined between a greater circumference and a coaxial lesser circumference. Such a bearing requires an opposing axial thrust which may be supplied by another such bearing in opposed position, or a thrust member, or resilient means.

The present invention permits the use of fluid bearings in those environmental conditions which would preclude the use of grease or oil lubrication required for a ball or roller bearing.

Depending upon the direction of maximum loading to be applied to the bearings, i.e. axially or radially or a resultant of both, the bearings may be designed to support the applied load by simply varying the positions of the fluid entry slots, with relation to the axis of the bearing.

Some embodiments of fluid bearing units in accordance with the invention are hereinafter described with reference to the figures of the accompanying drawings, wherein:

FIG. 1 is a central axial section of a first embodiment of bearing unit, having two rows of fluid entry slots, taken on the line I—I of FIG. 2;

FIG. 2 is a radial section of the embodiment of bearing unit of FIG. 1, taken partly on the line IIA—IIA and partly on the line IIB—IIB of FIG. 1;

FIG. 3 is a central axial section of a second embodiment of bearing unit, having a single row of fluid entry slots, taken on the line III—III of FIG. 4;

FIG. 4 is a radial section of the embodiment of bearing unit of FIG. 3, taken on the line IV—IV of FIG. 3, and showing respectively in the left-hand and right-hand parts of this figure radially-orientated fluid feed slots and tangentially orientated fluid feed slots;

FIG. 9 is an axial section of a fifth embodiment of fluid bearing unit.

Figure 5:
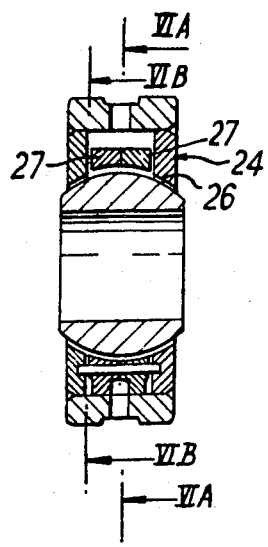
FIG. 5 is an axial section of a third embodiment of bearing unit having a double row of fluid entry slots, taken on the line V—V of FIG. 6.

In FIGS. 1 and 2, a bearing inner member consists of an annular element 1 having a cylindrical bore 2 to receive a shaft, and a part-spherical outer surface 3 forming one of the boundaries of a fluid bearing gap 4. The other boundary of the gap is constituted by a part-spherical inner surface 5 of a composite outer member 6. The outer member 6 is constituted by an assembly of annular elements 7, 8, 9 and 10 enclosed and secured by a wrapper ring 11. The surface 5 is formed on the elements 7, 8, 9, and 10. A plurality of radial slots 12 serve to feed fluid from an annular plenum chamber 13 to the bearing gap 4. The chamber 13 is supplied through inlets 14, and the elements 8 and 9 are cut off chordally at 15 so as to leave axial passages for flow of fluid from the plenum chamber 13 to the outer ends of the slots 12. The slots 12 are formed by milling or grinding, and lapping, axial recesses in the end faces of the elements 8 and 9, and then butting those recessed faces against purely radial end faces of the adjacent elements 7 and 10.

The slots may be formed in any of the ways indicated in my co-pending United Kingdom Patent Application No. 55455/68 filed Nov. 22, 1968, and advantageously one or both of the elements between which the bearing gap is defined may be made wholly or partly of silicon nitride.

Referring to FIGS. 3 and 4, the bearing outer member 17 is constituted by annular elements 18 and 19 secured and enclosed by a wrapper ring 20. A circumferential row of radial slots 21 is formed by providing axial recesses in the end face of one of the elements 18 or 19, and butting that end face up against an axial end face of the other of those two elements. In the left-hand side of FIG. 4, these slots 21 are radial slots. In the right-hand side of FIG. 4, the slots 22 are formed as tangents to a circle coaxial with the bearing gap, thereby to permit introduction of the bearing fluid in a direction which is counter to the direction of rotation of the inner member 23, as shown by the arrow, thereby to counteract tendency of the fluid film to rotate with the inner member 23.

Figure 6:
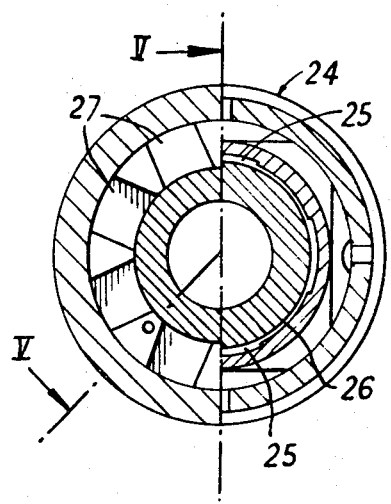
FIG. 6 is a radial section of the embodiment of bearing unit of FIG. 5, taken partly on the line VIA—VIA and partly on the line VIB—VIB of FIG. 5.

Referring to FIGS. 5 and 6, the bearing unit is similar to that described in relation to FIGS. 1 and 2, but the outer member 24 provides a plurality of pockets 25 spaced circumferentially about the axis of rotation and included in the bearing gap 26 fed with fluid through radial slots 27.

Figure 7:
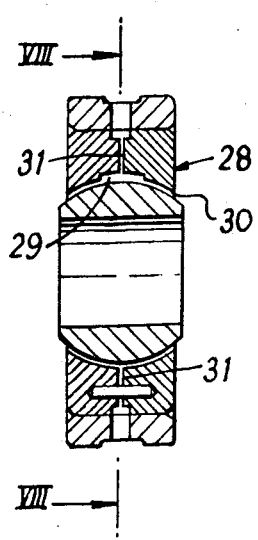
FIG. 7 is an axial section of a fourth embodiment of bearing unit having a single row of fluid entry slots, taken on the line VII—VII of FIG. 8.
Figure 8:
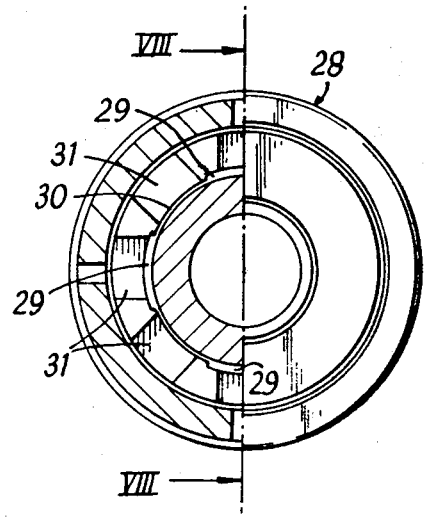
FIG. 8 is a partial radial section of the embodiment of bearing unit of FIG. 7, taken on the line VIII—VIII of FIG. 7.

Referring to FIGS. 7 and 8, the bearing unit is similar to that described in relation to FIG. 3, and the left-hand portion of FIG. 4, but the outer member 28 provides a plurality of pockets 29 spaced circumferentially about the axis of rotation and included in the bearing gap 30 fed with fluid through radial slots 31.

In all of the embodiments of FIGS. 1 to 8, the part-spherical surface of the inner and of the outer bearing member is defined between two lesser circumferences axially spaced one at each side of a coaxial intermediate greater circumference.

FIG. 9 is an axial section of a fifth embodiment of bearing unit in which an inner bearing member is an annular shaft portion 32 having a part 33 of lesser circumference and a part 34 of greater circumference, between which is defined a part-spherical bearing surface 35. An outer bearing member 36 is constituted by annular elements 37, 38 and 39 enclosed within and retained in assembly by a wrapper ring 40. A part-spherical bearing gap 41 is defined between the inner and outer bearing members. A first series of fluid feed slots 42 is defined between the elements 37 and 38, and a second series of fluid feed slots 43 is defined between the elements 38 and 39. The slots 41 and 42 are formed by providing recesses in a face of one or other of the two associated elements, and butting the recessed face against a non-recessed face of the other associated element. In the case of the slots 42, the abutted faces are frusto-conical. The slots 42 and 43 may have their medial line positioned radially, as shown in the left-hand half of FIG. 4, or tangentially as shown in the right-hand half of FIG. 4. A lesser circumference occurs on the element 37 and a greater circumference occurs on the element 39, and the part-spherical bearing surface is defined between those two circumferences.

I claim:-

1. A fluid bearing comprising: a radially inner bearing member and a radially outer bearing member, said radially outer bearing member having an internal surface, said radially inner bearing member having an external surface, said internal surface and said external surface defining between them a fluid bearing gap; one of said bearing members including lands or spacers of equal angular length; at least two parallel sided fluid feed slots disposed circumferentially, each said slot having two ends, one end of each said slot opening in said surface of one bearing member, each slot being of axial depth between 70 percent and 100 percent of the radial width of the bearing gap; and each slot being defined by the formula:

$$\alpha = K\left(\frac{y}{l}\right) \times \left(\frac{h}{z}\right)^3$$

wherein $\alpha$ = a dimensionless parameter between about 2 and about 8

$2/k$ = number of rows of slots $y$ = radial length of the slot $l$ = distance from the point of fluid entry into the bearing to the end of the bearing $h$ = radial width of the bearing gap $z$ = axial depth of the slot said one bearing member including passage means communicating with each slot for supply of fluid through said slot to the bearing gap and wherein said one bearing member includes two elements butted together at respective faces thereof, and wherein said slots are defined between said butted faces.

2. A fluid bearing, as claimed in claim 1, wherein said one bearing member includes an annular wrapper engaged with said two elements and retaining them with said faces in abutment.

3. A fluid bearing, as claimed in claim 1, wherein each slot has a median line which is radial to the axis of symmetry of said one bearing member.

4. A fluid bearing, as claimed in claim 1, wherein each slot has a median line which is tangential to a circle coaxial with the axis of symmetry of said one bearing member.

5. A fluid bearing, as claimed in claim 1, wherein said part-spherical internal surface of said radially outer bearing member, and said part-spherical external surface of said radially inner bearing member, are each respectively defined between two lesser circumferences axially spaced one at each side of a coaxial intermediate greater circumference.

6. A fluid bearing, as claimed in claim 1, wherein said part-spherical internal surface of said radially outer bearing member, and said part-spherical external surface of said radially inner bearing member, are each respectively defined between a greater circumference and a coaxial lesser circumference.

* * * * *